United States Patent Office 3,359,064
Patented Dec. 19, 1967

3,359,064
PROCESS FOR SEPARATING BERYLLIUM
VALUES FROM AQUEOUS SOLUTIONS
David J. Crouse, Jr., and Forest G. Seeley, Oak Ridge, Tenn., assignors to the United States of America as represented by the United States Atomic Energy Commission
No Drawing. Filed Nov. 13, 1964, Ser. No. 411,167
6 Claims. (Cl. 23—23)

ABSTRACT OF THE DISCLOSURE

A method of removing beryllium values from an aqueous acidic solution containing sulfate values comprising contacting said aqueous solution with an organic solution of a primary amine having two alkyl radicals on the primary carbon atom thereby extracting beryllium values into the organic solution.

Our invention relates to processes for separating beryllium values from aqueous solutions.

Liquid-liquid extraction processes are useful in recovering metal values from aqueous solutions, and such processes have been developed for separating beryllium values from aqueous solutions obtained by leaching beryllium-containing ores with sulfuric acid. However, the extracting agents found to be useful have the deficiency of requiring a relatively long contact time with the aqueous phase.

It is accordingly one object of our invention to provide an improved process for separating beryllium values from aqueous solutions.

It is another object to provide an improved process for concentrating beryllium values.

It is another object to provide a liquid-liquid extraction process for separating beryllium values from aqueous solutions wherein transfer of beryllium values from an aqueous to an organic phase is achieved in a relatively short time.

It is still another object of our invention to provide a liquid-liquid extraction process for separating beryllium values from an aqueous solution containing a relatively low concentration of beryllium values.

Other objects of our invention will become apparent from the following detailed description and the appended claims.

In accordance with our invention we have provided a method for separating beryllium values from an aqueous sulfuric acid solution containing said values together with extraneous values comprising the steps of contacting said aqueous solution with a substantially water-immiscible organic solution comprising an organic diluent and a primary amine containing from 15 to 25 carbon atoms and having the structure

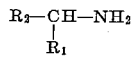

where $R_1$ and $R_2$ are selected from alkyl radicals containing from 4 to 12 carbon atoms, and separating the resulting beryllium-containing organic solution from the beryllium-depleted aqueous phase.

The primary amines having branching on the carbon atom attached to the nitrogen atom show good extraction coefficients for beryllium, and rapidly effect a transfer of beryllium into the organic phase, essentially all of the transfer occurring within two minutes.

In the first step of our process the aqueous acidic beryllium-containing solution is brought into contact with an organic solution of a branched-chain primary amine. The use of unbranched primary amines is not possible in our process due to the limited solubility of their salts in practicable diluents and their tendency to form stable emulsions. The amine must have two alkyl radicals, consisting of either branched or straight chains, attached to the primary carbon atom. Each of these radicals must contain from 4 to 12 carbon atoms and the total number of carbon atoms in the amine must be from 15 to 25. Preferably each radical attached to the primary carbon atom contains from 7 to 9 carbon atoms. Typical of these amines are 1-(3-ethylpentyl)-4-ethyloctylamine, 1-nonyldecylamine, and 1-heptyloctylamine.

The primary amine is carried in a suitable diluent. This diluent must be substantially insoluble in the aqueous phase and must dissolve the primary amine and the beryllium-amine-sulfate complex. The aliphatic hydrocarbons such as kerosene, aromatics such as aromatic petroleum products, and chlorinated hydrocarbons such as trichloroethylene are useful.

The concentration of amine in the diluent may suitably be within the range of 0.1 to 0.5 molar, and the preferred concentration is from 0.2 to 0.4 molar.

Beryllium-containing solutions derived from ores ordinarily contain high concentrations, relative to beryllium, of metal contaminants, particularly aluminum and iron. Extraction of iron is avoided by its reduction to the non-extractable ferrous state prior to contact with the amine. If aluminum is present it is extracted to some extent and depresses the extraction coefficients for beryllium. The extraction of beryllium in the presence of aluminum may be increased by providing fluoride in the aqueous solution up to about two grams of fluoride per gram of aluminum. Additional fluoride has an adverse effect on beryllium extraction. If separation of beryllium and aluminum beyond that achieved by our extraction process is desired, use may be made of prior art precipitation methods of separating beryllium and aluminum based upon the difference in pH values at which the aluminate (pH 10.2) and the beryllate (pH 13) are formed.

The beryllium extraction coefficient increases with increasing pH in the range 1.0 to 3.5. However, solutions containing significant quantities of aluminum must be kept at a pH of 3.0 or lower to avoid precipitation. The preferred pH range for processing liquids derived from aluminum- and beryllium-containing ores is from 1.7 to 3.0.

The extraction coefficient for beryllium increases with increase in sulfate concentration in the range 0.1 to 2 molar. The sulfate concentration in the liquor is governed by the leaching conditions used and is typically 0.2 to 1.0 molar.

The maximum quantity of beryllium is extracted within a relatively short time, i.e., less than two minutes, and longer contact times serve no useful purpose.

The aqueous phase, depleted of beryllium, and the beryllium-rich organic phase are separated. The beryllium may then be recovered from the organic phase without other intervening process steps; however, in the preferred method of carrying out our invention a scrubbing step is used to further purify the beryllium. We have found that a 0.01–0.05 molar solution of sulfuric acid is an economical and effective agent to further separate aluminum from beryllium.

Beryllium values are recovered from the resulting separated organic solution by stripping with an aqueous solution. Basic reagents ($Na_2CO_3$, NaOH) strip beryllium effectively, but sometimes form slow-breaking emulsions. Acidic nitrate and chloride solutions are effective in stripping beryllium from the organic phase. However, the use of these solutions requires that the amine be reconverted to the sulfate form prior to recycling; consequently, sulfuric acid is the preferred stripping agent. The concentration of sulfuric acid may range from 0.3 to 3.0 molar and the preferred concentration is 0.5 to 1.0 molar.

The beryllium in the resulting aqueous solution may be precipitated and recovered as the hydroxide.

Having thus described our invention, the following examples are offered to illustrate it in more detail.

Examples I–III show the extraction power of branched-chain primary amines for beryllium.

Example I

An aqueous solution 0.02 molar in beryllium, 1.8 molar in sulfate, and having a pH of 2.6 was contacted with an equal volume of 0.3 molar solution of 1-(3-ethylpentyl-4-ethyloctyl)amine (in the sulfate salt form) in Solvesso 100. Solvesso 100 is a high flash point aromatic petroleum product. After ten minutes' contact the two phases were separated. Analyses of the two phases after separation showed that the extraction coefficient for beryllium was 10.0.

Example II

The procedure of Example I was followed using 1-heptyloctylamine as the extracting agent. The beryllium extraction coefficient was 2.7.

Example III

The procedure of Example I was followed using 1-nonyldecylamine as the extracting agent. The beryllium extraction coefficient was 3.2.

Example IV shows the relatively poor extraction coefficient of an amine having three radicals attached to the carbon atom adjacent the nitrogen atom.

Example IV

The procedure of Example I was followed using Primene JM as the extracting agent. Primene JM is an amine having the general formula

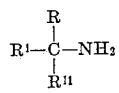

and having from 18 to 22 carbon atoms. The extraction coefficient for beryllium was 0.5.

Example V shows the speed at which equilibrium is reached in our extraction process.

Example V

An aqueous solution 0.02 molar in beryllium and 1.8 molar in sulfate, having a pH of 2.0, was contacted with a 0.3 molar solution of 1-(3-ethylpentyl-4-ethyloctyl)-amine in Solvesso 100. Analyses were made to determine the amount of beryllium extracted at various times. At the end of one minute the extraction coefficient was 3.4, at the end of five minutes 3.6, at the end of ten minutes 3.6, and at the end of one hour 3.6.

Example VI describes a batchwise countercurrent test demonstrating the separation of beryllium values from an aqueous solution.

Example VI

A synthetic beryllium leach liquor containing 0.5 gram beryllium per liter, 5 grams of aluminum per liter, 0.5 gram ferrous iron per liter, 2.5 grams fluoride per liter, 1 molar in sulfate and having a pH of 2.9 was contacted with 0.3 molar 1(3-ethylpentyl)-4-ethyloctylamine in Solvesso 100 in batch countercurrent fashion. There were six extraction and four scrub stages. Numbering the stages from 1 to 10, stages 7–10 were the scrubbing stages. The aqueous feed was introduced into the system at stage 6. From this stage it, together with the aqueous scrub solution from stage 7, passed through successively lower numbered stages until it was removed from the system at stage 1. The organic solution was introduced into the system at stage 1 and passed through successively higher numbered stages until it was removed from the system at stage 10. The scrubbing solution, introduced into the system at stage 10, was 0.02 molar $H_2SO_4$. The feed ratios were 10/7.6/2.5 (organic/aqueous feed/scrub). After steady-state conditions were obtained, analyses were made of beryllium and aluminum is each stage. The results of these analyses are given in the following table:

| Stage No. | | Analysis in grams/liter | | | |
| --- | --- | --- | --- | --- | --- |
| Extraction | Scrub | Aqueous | | Organic | |
| | | Be | Al | Be | Al |
| 1 | | 0.03 | | 0.05 | 0.31 |
| 2 | | 0.09 | | 0.11 | 0.30 |
| 3 | | 0.16 | | 0.21 | 0.19 |
| 4 | | 0.31 | | 0.35 | 0.11 |
| 5 | | 0.42 | | 0.41 | 0.06 |
| 6 | | 0.50 | | 0.44 | |
| | 7 | 0.34 | 1.25 | 0.43 | 0.047 |
| | 8 | 0.27 | 0.67 | 0.45 | 0.026 |
| | 9 | 0.21 | 0.34 | 0.45 | 0.026 |
| | 10 | 0.13 | 0.28 | 0.41 | 0.019 |

As can be seen from Example VI, 92% of the beryllium was recovered in the organic stream, and the ratio of aluminum to beryllium in the aqueous feed of 10:1 was changed to 1:22.

Example VII illustrates recovery of beryllium from an actual ore leach liquor derived by leaching a Utah beryllium ore with sulfuric acid.

Example VII

A liquor containing 0.65 gram beryllium per liter, 4 grams aluminum per liter, 7.4 grams magnesium per liter, 2.3 grams ferrous iron per liter, 0.4 gram calcium per liter, 0.4 grain maganese per liter, 0.7 gram silica per liter, 15.7 grams fluoride per liter and 111 grams sulfate per liter was adjusted to pH 3 with ammonia. This feed solution was then contacted with 0.3 molar 1-(3-ethylphenyl)-4-ethyloctylamine in Solvesso 100 using the batch countercurrent method described in Example VI. There were six extraction and two scrub stages. The scrub solution was 0.02 molar sulfuric acid. The feed ratios were 20/5/3 (organic/aqueous feed-scrub). After steady-state conditions were obtained, analyses were made of the beryllium and aluminum concentrations in each stage. The results of these analyses are given in the following table:

| Stage No. | | Analysis in grams/liter | | | |
| --- | --- | --- | --- | --- | --- |
| Extraction | Scrub | Aqueous | | Organic | |
| | | Be | Al | Be | Al |
| 1 | | 0.016 | 4.4 | 0.008 | 0.166 |
| 2 | | 0.034 | 4.6 | 0.033 | 0.176 |
| 3 | | 0.059 | 4.7 | 0.053 | 0.173 |
| 4 | | 0.087 | 4.5 | 0.060 | 0.167 |
| 5 | | 0.139 | 4.6 | 0.105 | 0.143 |
| 6 | | 0.256 | 4.4 | 0.195 | 0.104 |
| | 7 | 0.153 | 1.1 | 0.187 | 0.045 |
| | 8 | 0.117 | 0.7 | 0.169 | 0.021 |

As can be seen from the above data, 96 percent of the beryllium was recovered in the organic streams and the ratio of aluminum to beryllium in the aqueous feed of 6.2:1 was changed to 1:8.

Beryllium was recovered from the scrubbed extract by contacting it with 1.0 molar sulfuric acid. The beryllium contained in the strip solution was precipitated with ammonia. The precipitate was reslurried in caustic solution at pH 12 and digested at 80° C. for one-half hour. The caustic treatment dissolved essentially none of the beryllium but most of the aluminum. The dissolved aluminum was separated from the beryllium hydroxide precipitate by filtration. The aluminum to beryllium ratio in the final product was only 1:100. The product also contained minor amounts of magnesium, calcium, and iron.

The above examples are intended to illustrate and not limit our invention. It is obvious that changes may be made in methods of contacting, flow ratios, diluent, and extractant. Our invention should be limited only in accordance with the following claims.

We claim:
1. A method for separating beryllium values from an aqueous sulfuric acid solution containing said values together with extraneous values and 0.1 to 2 molar in sulfate comprising the steps of contacting said aqueous solution with a substantially water-immiscible organic solution comprising an organic diluent and a primary amine containing from 15 to 25 carbon atoms and having the structure

$$R_2-CH-NH_2$$
$$|$$
$$R_1$$

where $R_1$ and $R_2$ are selected from alkyl radicals having from 4 to 12 carbon atoms, said amine being present in said organic solution in a concentration high enough to extract beryllium values, and separating the resulting beryllium-containing organic solution from the beryllium-depleted aqueous phase.

2. The method of claim 1 wherein $R_1$ and $R_2$ are selected from alkyl radicals having from 7 to 9 carbon atoms.

3. The method of claim 1 wherein the primary amine is selected from the group consisting of 1-heptyloctylamine, 1-nonyldecylamine, and 1-(3-ethylpentyl)-4-ethyloctylamine.

4. The method of claim 1 wherein the pH of the aqueous solution is maintained in the range of 1.7 to 3.0.

5. The method of claim 4 wherein the aqueous phase contains from 0.1 to 2 molar sulfate.

6. A process for recovering beryllium values from an aqueous sulfuric acid solution containing said values and 0.1 to 2.0 molar in sulfate comprising:

(a) contacting said aqueous solution at a pH of 1.7–3.0 with a 0.1–0.5 molar solution of a branched-chain primary amine having the structure $$R_2-CH-NH_2$$
$$|$$
$$R_1$$

where $R_1$ and $R_2$ are selected from alkyl radicals having from 7 to 9 carbon atoms, said amine being dissolved in an organic diluent;

(b) separating the resulting beryllium-containing organic solution from the beryllium-depleted aqueous phase;

(c) contacting the separated organic solution with a scrubbing solution containing 0.01 to 0.05 molar sulfuric acid;

(d) separating the scrubbed organic phase from said scrubbing solution; and (e) recovering beryllium values from the resulting scrubbed organic phase.

References Cited

UNITED STATES PATENTS

| | | | |
|---|---|---|---|
| 1,867,755 | 7/1932 | Pelc | 23—18 X |
| 3,131,994 | 5/1964 | Surls et al. | 23—183 X |
| 3,145,081 | 8/1964 | Surls et al. | 23—23 X |

OSCAR R. VERTIZ, *Primary Examiner.*

H. T. CARTER, *Assistant Examiner.*